United States Patent [19]
Assinder et al.

[11] Patent Number: 5,652,006
[45] Date of Patent: Jul. 29, 1997

[54] METHOD OF HEAT PROCESSING FOODSTUFF

[75] Inventors: Ivar Assinder, Kempston, England; Robert David Jones, Bedford, United Kingdom; Peter Wilding, Northampton, United Kingdom; Peter Richard Stephenson, Bedford, United Kingdom

[73] Assignee: Unilever Patent Holdings B.V., Vlaardingen, Netherlands

[21] Appl. No.: 431,065

[22] Filed: Apr. 28, 1995

Related U.S. Application Data

[63] Continuation-in-part of Ser. No. 133,383, Oct. 8, 1993, abandoned.

[30] Foreign Application Priority Data

Oct. 9, 1992 [EP] European Pat. Off. .............. 92309217
Jul. 19, 1994 [EP] European Pat. Off. .............. 94305317

[51] Int. Cl.$^6$ ..................................................... A23L 3/005
[52] U.S. Cl. ....................... 426/231; 426/233; 426/237; 426/241; 426/243; 426/244; 392/322; 392/323; 219/771; 99/358; 99/467; 99/470; 99/472; 99/485; 99/516
[58] Field of Search .................................... 426/231, 233, 426/234, 237, 241, 244, 243, 521, 523; 392/322, 323; 219/771; 99/358, 467, 470, 472, 485, 516; 422/28, 29, 22, 23, 32, 33

[56] References Cited

U.S. PATENT DOCUMENTS

| | | | |
|---|---|---|---|
| 3,398,251 | 8/1968 | Jeppson | 426/234 X |
| 3,437,495 | 4/1969 | Jeppson | 426/241 |
| 3,889,009 | 6/1975 | Lipoma | 426/243 X |
| 4,169,123 | 9/1979 | Moore et al. | 422/29 |
| 4,496,594 | 1/1985 | Miyahara | 426/234 |
| 4,522,834 | 6/1985 | Miyahara | 426/234 X |
| 4,612,199 | 9/1986 | Miyahara | 426/237 |
| 4,812,609 | 3/1989 | Butot | 99/358 X |
| 4,910,371 | 3/1990 | Brun et al. | 426/244 X |
| 4,971,819 | 11/1990 | Miyahara | 426/244 |
| 5,066,503 | 11/1991 | Ruozi | 426/241 X |
| 5,279,213 | 1/1994 | Miyahara | 99/358 |

FOREIGN PATENT DOCUMENTS

| | | |
|---|---|---|
| 62-186776 | 8/1987 | Japan . |
| 8906121 | 7/1989 | WIPO . |
| 922150 | 2/1992 | WIPO . |

OTHER PUBLICATIONS

Translation of Japanese Laid–Open Patent No. 62/186,776 to Kingo Miyahara. Aug. 1987.
Himmelblau, D. M., Basic Principles and Calculation in Chemical Engineering, fourth edition, published in 1982 by Prentice–Hall, Inc., pp. 252–255.
JP Patent Abstract,—89–299510, Japan, May 8, 1987.
JP Patent Abstract,—87–129402, Japan, Jun. 30, 1986.
JP Patent Abstract,—86–250286, Japan, Mar. 24, 1980.
JP Patent Abstract,—61–35773, Japan, Feb. 20, 1986.
2520 Deutsche Molkerei–Zeitung (DMZ) 110, (8), Feb. 23, 1989.

*Primary Examiner*—Milton Cano
*Attorney, Agent, or Firm*—Cushman Darby & Cushman, IP Group of Pillsbury Madison & Sutro, LLP

[57] ABSTRACT

A method of processing a solid foodstuff, such as a meat portion or portion of plant foodstuff, by a heating and cooling cycle in which the environmental pressure applied to the foodstuff is controlled during heating so that, at a maximum target temperature, all parts of the body of the foodstuff are conformed to this target temperature due to flow of water, transiently in the vapour phase, from hotter regions to cooler regions. In particular, at least when the target temperature is nominally attained, the pressure is set to the saturated vapour pressure of the foodstuff at the maximum target temperature.

19 Claims, 8 Drawing Sheets

METHOD OF HEAT PROCESSING FOODSTUFF

RELATED APPLICATIONS

This application is a continuation-in-part of application No. 08/133,383 filed 8th Oct., 1993, now abandoned.

FIELD OF THE INVENTION

This invention relates generally to a method of and apparatus for food processing. More particularly, the invention relates to a method of and apparatus for processing a particular class of solid foodstuffs using a particular class of heating methods, as hereinafter explained.

BACKGROUND OF THE INVENTION

A number of food processing methods comprise the steps of heating to an elevated temperature to effect cooking and/or sterilisation and then cooling prior to aseptic packaging. For any particular foodstuff, the maximum target temperature to be attained by heating, and generally held for a short period to achieve sterilisation, is quite critical, as it affects the quality of the finished product. Especially in the case of a solid foodstuff, it has proved very difficult with known methods to achieve the target temperature uniformly throughout the mass of the foodstuff, with the result that localised overcooking or undercooking occurs and/or the quality of the finished product is impaired.

THE INVENTION

According to one aspect of the invention there is provided a method of processing a solid foodstuff using a mass heating method, according to which, during at least part of the heating step, the environmental pressure of the foodstuff being heated is so controlled in relation to a determined saturated vapour pressure of the foodstuff at a maximum temperature to be achieved, so as to obtain a substantially uniform temperature throughout the solid foodstuff at the maximum target temperature.

In this specification and the appended claims the term "solid foodstuffs" is used to define foods containing water but which do not have a flow capability, but whilst having a shape-defining structure contain, or through a cooking process develop, pathways enabling the passage of a fluid from one part of the structure to another. Examples are chicken meat, courgettes, carrots, peas, beans, broccoli and strawberries. Generally, therefore, the term "solid foodstuffs", includes meat and fish portions, and portions of plant foodstuff deriving from any part of a plant, i.e. root, stem, leafage, flower, fruit, vegetable or seed.

Additionally, the class or heating/cooling methods with which the invention is concerned is referred to in the specification and the claims as a mass heating or cooling method, being a method in which the entire mass of the solid foodstuff (as hereinbefore defined) is subject to the effect of applied heat or to the cooling effect respectively, as distinct from a method in which heat or the cooling effect applied to the exterior is transmitted by conduction to the interior. Examples of mass heating methods are ohmic heating and microwave heating, but these examples are not exhaustive; retort heating is not an example of such a mass heating method. Vacuum or reduced pressure evaporative cooling is an example of a mass cooling method.

In a preferred method, the heating step inchdes a major phase in which the temperature of the foodstuff is raised nominally to achieve the maximum target temperature and a holding phase in which the temperature of the foodstuff is held at the nominally attained maximum target temperature.

The environmental pressure during the major phase may be held constant or given a rising profile if appropriate so that uniform heating can be effected to a temperature in excess of 100° C., preferably a temperature above 118° C. and most preferably between 122° C. and 147° C. During at least an initial part of the holding phase, when heating is maintained but optionally at reduced power, the environmental pressure is controlled to be equal to the saturated vapour pressure (SVP) of the water in the foodstuff at the maximum target temperature. It is at this time that, primarily due to transfer of water, transiently in the vapour phase, occurring from the hottest parts of the solid foodstuff (above the maximum target temperature) to the coolest parts (below the maximum target temperature), that all parts of the foodstuff are brought to the maximum target temperature. Subsequently, possibly with application of heat discontinued, the foodstuff may be held at the maximum target temperature to achieve a required effect such as sterilisation.

It has been found that the foodstuff should preferably be held at the maximum target temperature (a temperature in excess of 100° C. up to 147° C.) for less than 60 seconds, more preferably less than 30 seconds, especially in the case of a plant foodstuff, for which foodstuffs at least it is also preferred for the temperature of the foodstuff not to exceed 70° C. for more than 300 seconds, preferably not more than 100 seconds. Most preferably, the time period for which the foodstuff is raised to a temperature above about 118° C. is 15 to 26 seconds, made up of a heating phase of about 10 degrees/second, an approximately 6 second holding phase and a 1 degree/second cooling phase.

In practice, the environmental pressure may be kept substantially equal to the said SVP at the maximum target temperature throughout heating, or it may have an increasing value to be equal to the rising saturated vapour pressure of the water in the foodstuff as its temperature increases. Moreover, it is conceivable that an environmental pressure related to but slightly different from the saturated vapour pressure of the foodstuff, for example slightly higher than the SVP, may achieve an acceptable result.

Environmental pressure may be adjusted using any appropriate means, however it is particularly advantageous to use steam to adjust the pressure because steam has the added benefit of sterilising all surfaces.

A preferred method of heating is ohmic heating. Ohmic heating is a procedure whereby the foodstuff is immersed in a solution of an electrically conductive fluid (contact solution), conveniently a saline solution, and an alternating voltage is applied between immersed electrodes to cause an electric current to pass through the solution and the foodstuff in order to heat the foodstuff. In some instances it may be possible to dispense with the conductive fluid and place the electrodes in direct contact with the foodstuff.

It is important that the foodstuff undergoes the necessary heat treatment uniformly throughout the mass of the foodstuff, especially in the case of plant foodstuffs, and it is therefore preferable to provide a foodstuff carrier, immersed in the conductive fluid and serving to provide localised regions of convection of the fluid such that any cooler regions of the fluid are kept away from the foodstuff, as explained in more detail below.

Subsequent to mass heating, a preferred method of mass cooling, for example prior to sterile packaging, is cooling by evaporation, achieved by applying a partial vacuum to the foodstuff to reduce the environmental pressure to a value lower than the saturated vapour pressure of the foodstuff (after separation from the saline solution). However, other possible methods of cooling are by use of chilled water or cryogens.

According to another aspect of the invention, there is provided apparatus for processing a foodstuff (as hereinbefore defined) by a mass heating method (as herein defined), characterised by a container for the foodstuff to be heated, means for heating the foodstuff in the container by a mass heating method in order nominally to raise the temperature of the solid to a maximum target temperature appropriate for cooking or sterilisation, and means for controlling the pressure within the container during heating, in relation to a determined saturated vapour pressure of the foodstuff at the target temperature, to cause all parts of the solid foodstuff to attain the said maximum target temperature.

The container preferably accommodates a saline solution with immersed electrodes, and in use the foodstuff is immersed in the solution and an alternating voltage is applied to the electrodes to cause an electric current to pass through the solution in order to heat the foodstuff (ohmic heating).

Preferably, a carrier is provided for the foodstuff within the container, serving to control convection currents in the solution in a manner which ensures ambient stability for the foodstuff.

Preferably, the pressure control means comprises means firstly fly for maintaining a chosen fixed or varying pressure in the container throughout a major phase of heating during which the temperature of the foodstuff is raised nominally to attain the maximum target temperature and, secondly, during at least part of a holding phase during which the temperature of the foodstuff is held at the nominally attained maximum target temperature, for maintaining a pressure in the container substantially equal to the saturated vapour pressure (SVP) of the foodstuff at said critical maximum temperature.

In order to achieve ambient stability as well as a quality product it is necessary that the product undergoes the required heat treatment uniformly throughout the mass of the foodstuff. When ohmic heating with a contact solution is used as the mass heating method, a common problem is that convection within this contact solution in combination with loss of heat through the container wall, causes the contact solution near the container wall to be colder than the bulk of the contact solution. This colder liquid moves towards the bottom of the container due to its higher density, and a thick layer of cold liquid accumulates. This colder contact solution has a lower conductivity and thus heats the foodstuff much slower than the bulk of the contact solution resulting in non-uniform heating of the foodstuff.

A solution to this problem is to provide a carrier within the container which accommodates the foodstuff to be heated. The carrier provides localised areas of convection of the contact solution such that any cool areas of contact solution are kept away from the foodstuff.

Accordingly, it is preferred that when ohmic heating is used as the mass heating method, a carrier is employed. Such a specially designed carrier can ensure uniform ohmic heating in the solid foodstuff by serving two purposes.

(a) The structure of the carrier is such that convection is localised and any cool areas of contact solution are limited to a compartment adjacent to the container wall.

(b) The food product is located within the container and thus kept away from the cool areas of contact solution.

The carrier may be made out of any food compatible material which has conductivity which is equivalent to or lower than the conductivity of the food. The preferred material is chosen from polyvinyl diene fluoride (PVDF), and polyethyl sulphone (PES).

Additionally, when small food products are being heated, for example peas, a mesh made of food compatible plastics which is able to withstand high temperatures is preferably placed within the carrier to retain the food product. The mesh may suitably be made from polytetrafluroethylene (TEFLON).

DESCRIPTION OF EMBODIMENT

Processing method and apparatus in accordance with the invention, as practised in the laboratory, is exemplified in the following description, making reference to the accompanying drawings, in which.

Figure 1:
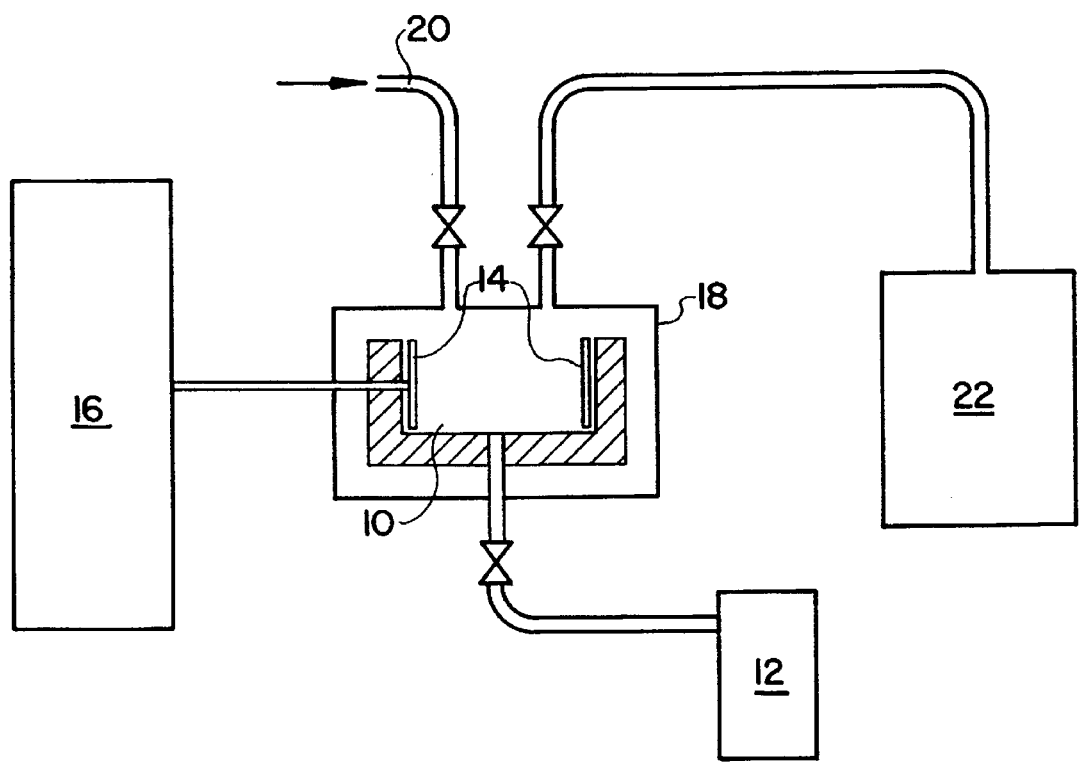
FIG. 1 shows a laboratory test rig for practising the method of the invention.

FIG. 1 shows a laboratory test rig comprising a cell 10 of plastics material for accommodating the foodstuff (not shown) to be processed. The cell 10 can be filled with a conductive fluid solution, for example a saline solution, and accommodates electrodes 14, conveniently of titanium coated with platinum, which in use are immersed in the saline solution. Cell 10 can be emptied of saline solution into a vessel 12. A power supply 16 is able to apply an alternating voltage between the electrodes 14, in use to cause a current to flow through the solution, and through a solid foodstuff item immersed in the solution, in order to raise the temperature of the foodstuff by ohmic heating.

Other possible electrodes may for example be made of metal coated with platinum, titanium coated with iridium oxides or platinum iridium combinations, and other possible conductive solutions include potassium chloride, calcium chloride and sodium sulphate.

The ohmic heating cell 10 is housed in a pressure vessel 18, connected by line 20 to a source of compressed air (or other suitable fluid such as steam) which can be modulated and also connected to a vacuum pump 22. By suitably adjusting the pressure in the vessel 18 and applying heating the temperature of the foodstuff being processed can be adjusted to values above or below 100° C., for example in the range 70° to 140° C.

The voltage applied across the ohmic cell 10 is adjustable by a suitable device such as a Variac device or an automatic method; additionally, the concentration of the saline solution can be selected to suit requirements.

The food processing method in accordance with the invention was carried out, using the above-described apparatus, for five kinds of solid foodstuff, namely chicken breast, courgette, carrot, peas and beans.

Figure 2:
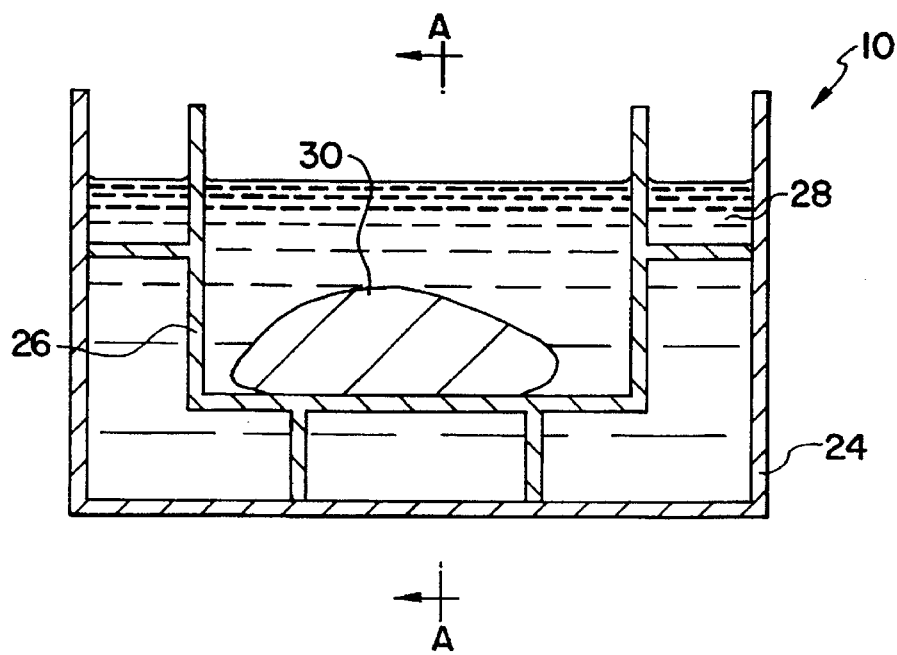
FIG. 2 shows a typical construction of container and foodstuff carrier.
Figure 3:
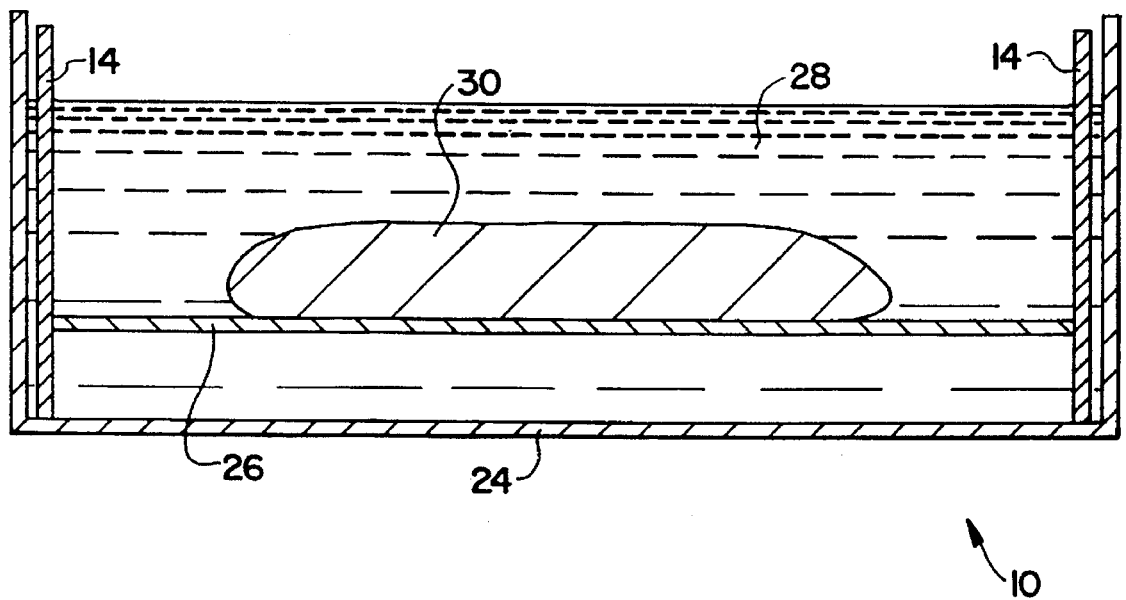
FIG. 3 shows the carrier of FIG. 2 as viewed along the cross-section A—A.
Figure 4:
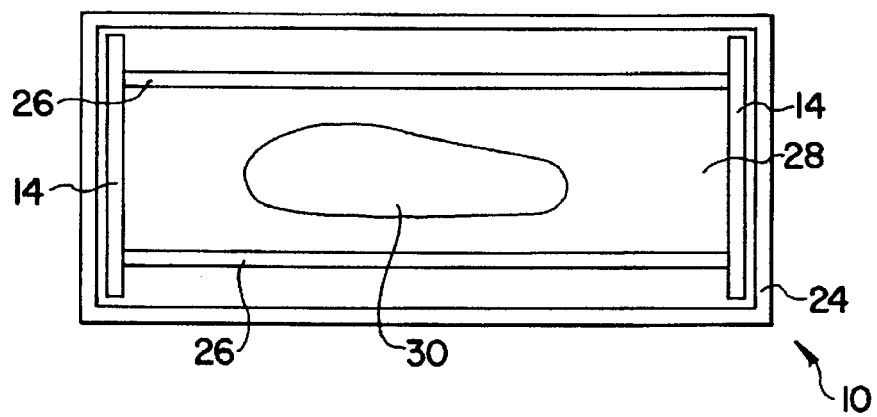
FIG. 4 shows the carrier of FIG. 2 as viewed from above.
Figure 5:
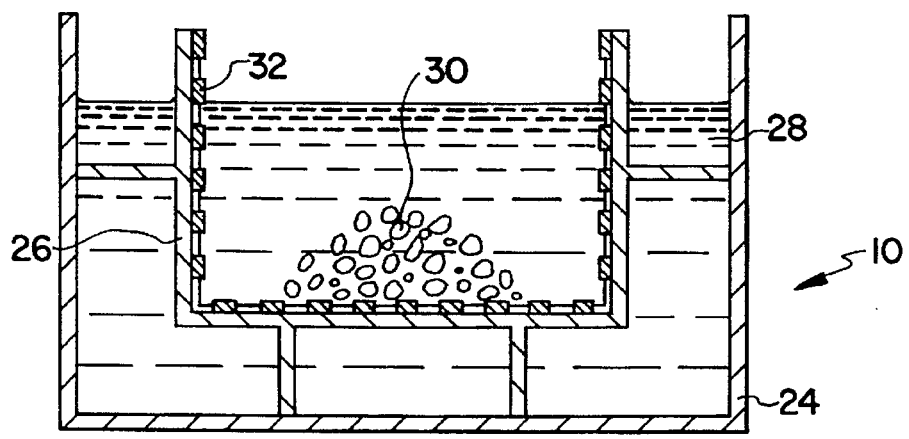
FIG. 5 shows the carrier of FIG. 2 additionally comprising a mesh.
Figure 6:
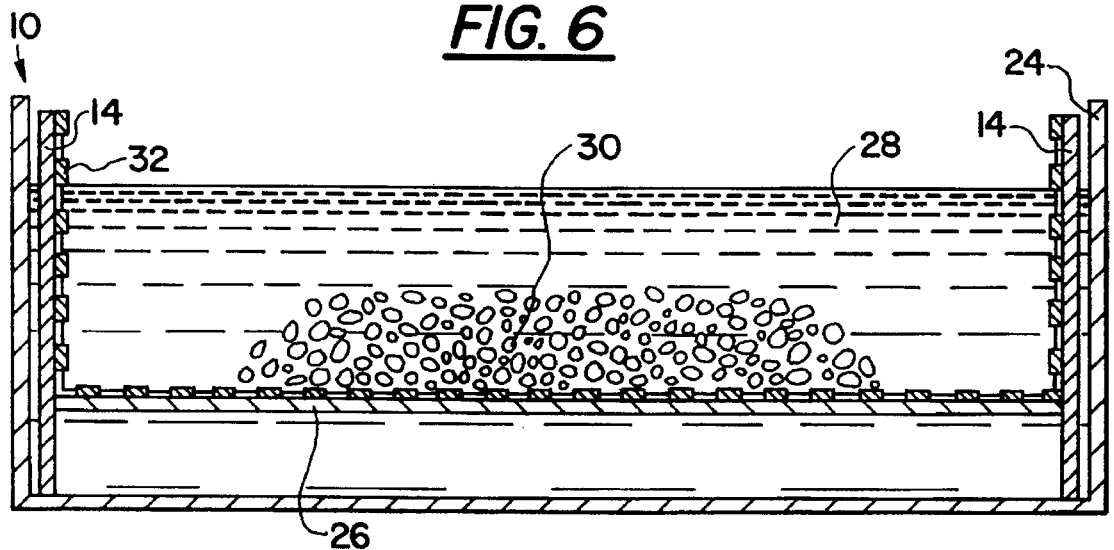
FIG. 6 shows the carrier of FIG. 2 as viewed along the cross-section A—A, additionally comprising a mesh.

Especially in the case of a plant foodstuff, it is preferred to use as the cell 10 a container incorporating a foodstuff carrier, an example of which is shown in FIGS. 2 and 6. In these FIGS., which are self-explanatory, reference 24 denotes the wall of the container which defines the above cell 10, reference 26 denotes the foodstuff carrier, reference 28 denotes the conductive fluid, reference 30 denotes the foodstuff, reference 14 denotes the electrodes and, in FIGS. 5 and 6, reference 32 denotes a mesh for supporting a meat product such as mince or a plant product such as peas, beans, sprouts or strawberries.

The same method was employed in general terms in the laboratory for all five foodstuffs and this general method is first described.

Initially, the optimum concentration of saline solution required to give most uniform temperature distribution in the cell (and thus in the foodstuff) was determined. The method used was first to prepare a number of saline solutions of differing concentration (within the range 0.1 to 1.0%) then to insert several (at least five) thermocouples into different parts or pieces of the foodstuff to be heated, in order to measure temperatures in thin and thick parts and central as well as surface parts. The foodstuff was placed into the heating cell together with one of the prepared saline solutions and heating applied. The temperatures achieved were recorded and the experiment repeated for all the saline concentrations. By inspection of the temperature records for all the experiments it was possible to determine the approximate concentration of saline that gave the most uniform temperature distribution.

The above experiments were then repeated but using a narrower range of salt concentrations above and below the best concentration identified. In this way a succession of experiments enabled an accurate determination of the best saline concentration to use for the particular foodstuff.

Next, the saturated vapour pressure (SVP) of the foodstuff was determined at the intended maximum target temperature to be attained during the process. This SVP can be determined in various ways, but in the present case an iterative procedure was adapted by first setting the pressure in the vessel to be equal to the vapour pressure of water and observing the temperature achieved during heating. An adjustment was then made to the set pressure and the temperature achieved again observed. The iterations were repeated until the pressure was found which enabled the intended target temperature to be reached during heating.

The saline solution and foodstuff were then located into the heating cell, the cell placed in the pressure vessel and the pressure set to the SVP as previously determined.

Power was then switched on to effect heating at a desired rate, in order to bring the saline solution and the foodstuff nominally to the intended target temperature.

The heating step then has a holding phase in which the temperature of the foodstuff is maintained nominally at the target temperature, if appropriate by heating with reduced power. During the first part of the holding phase, it has been found that all parts of the product are brought substantially to the exact target temperature. The principal mechanism by which this occurs, apart from the continued heating, is that because the pressure vessel is set to the SVP (saturated vapour pressure of the water in the foodstuff at the target temperature), water transiently in the vapour phase migrates within the foodstuff from relatively hot regions (in excess of the target temperature) to relatively cool regions (below the target temperature).

When the whole of the foodstuff is equilibrated to the target temperature, the holding phase is continued to achieve a desired effect such as sterilisation. Heating during this time may be discontinued or maintained at reduced power.

On completion of the holding phase, power if any is switched off and the saline solution is ejected from the heating cell.

Cooling is then commenced by maintaining/controlling the environmental pressure of the foodstuff lower than the saturated vapour pressure of the foodstuff. When cooling by evaporation is complete, fluid is passed into the cell to restore ambient atmospheric pressure. Preferably the fluid is steam or sterile air. Most preferably the fluid is steam.

This, in more detail, cooling is effected by removal of the water vapour in the foodstuff by the application of a partial vacuum at a controlled rate. The cooling rate is controlled by pressure. When cooling by evaporation is complete, fluid is passed into the cell to restore ambient atmospheric pressure. Preferably the fluid is steam or sterile air. Most preferably the fluid is steam.

Typically the rate of cooling is in the range of 0–5° C. per second.

In a particularly preferred process of the invention, subsequent to process steps (a) & (b) the vegetable product is transferred to an aseptic environment for filling, packing and sealing. The aseptic environment can be suitably provided by vaporised hydrogen peroxide. The use of hydrogen peroxide to sterilise surfaces is disclosed in, for example, WO 89/06121.

In the above described method, thermocouples were implanted in various parts of the foodstuff to check the uniformity through the foodstuff of the target temperature achieved. The temperatures measured by five thermocouples implanted in the foodstuff are shown by the graphs of FIGS. 7 to 11, respectively in the case of chicken breast, courgette, carrot, peas and beans. Before describing these graphs, however, quantitative details of the method are given for the three examples in question.

In the case of whole chicken breast of 150 g weight, the optimum saline solution concentration was determined as 0.6 per cent. The SVP of the chicken breast at 132° C. was determined as 1.75 bar guage. An alternating voltage at 50 Hz of 180 V was applied between the electrodes, causing current to flow through the saline solution and chicken breast fully immersed therein. When the last of the five thermocouples showed a temperature of 132° C., power was switched off and the cell allowed to stand for 36 seconds. Saline solution was then ejected via a discharge valve. Then a vacuum of 0.5 bar absolute was applied to the cell to cause a rapid drop in temperature. Finally, the vacuum was disconnected and air allowed to enter the cell, enabling the pressure vessel to be opened and the heat processed chicken breast removed.

For courgette (3 cm long, 3.5 cm diameter), the only differences were that the optimum saline concentration was determined to be 0.15 per cent, whilst the applied alternating voltage was 400 V.

For carrot, the optimum saline concentration was determined to be 0.125 per cent and the applied voltage was 450 V. Other details were the same as for chicken breast. The carrot was in the form of five cubes of side 10 mm, and one thermocouple was implanted in each cube.

In the case of peas, an ohmic cell of the construction shown in FIGS. 5 and 6 was employed.

A 30 g sample of peas was processed, by the above described method. The optimum saline solution concentration was determined as 0.1%. The SVP of the peas at 135° C. was determined as 2.08 bar guage. An alternating voltage at 50 Hz of 600 v was applied between the electrodes, causing current to flow through the saline solution and peas fully immersed therein. A heating rate of 10° C. sec$^{-1}$ was achieved. The maximum temperature was 135° C. Thermocouples were inserted into 3 peas, one near to an electrode, one towards the bottom of the cell and one near to the top of the cell. When the last of these thermocouples showed a temperature of 135° C., power was switched off. Saline solution was then ejected via a discharge valve. Then a vacuum was applied to the cell at a controlled rate to cause a cooling rate of 1° C.sec$^{-1}$. The final product temperature achieved was 45° C. at an absolute pressure of 0.12 bar. Finally the vacuum was disconnected and air allowed to enter the cell, enabling the pressure vessel to be opened and the heat-processed peas removed. The total time the peas were at a temperature above 118° C. was 26 seconds and the time for which the peas were above 70° C. was 63 seconds.

The peas were assessed by a trained sensory panel. The peas had texture and flavour characteristics comparable to a frozen pea.

For comparison purposes, processing was repeated except that the peas were heated to a temperature of 121° C. and held for 170 seconds. A vacuum was then applied at a controlled rate to the cell to cause a cooling rate of 1° C.sec$^{-1}$. Thus the total time the peas were at a temperature of above 118° C. was 174 seconds and the time for which the peas were at a temperature of above 70° C. was 300 seconds.

The peas were assessed by a trained sensory panel. The peas had texture and flavour characteristics substantially inferior to frozen peas and the peas when processed by the preferred method first described.

For beans, processing was carried out in a manner analogous to that employed for peas and equally favourable results were achieved.

Figure 7:
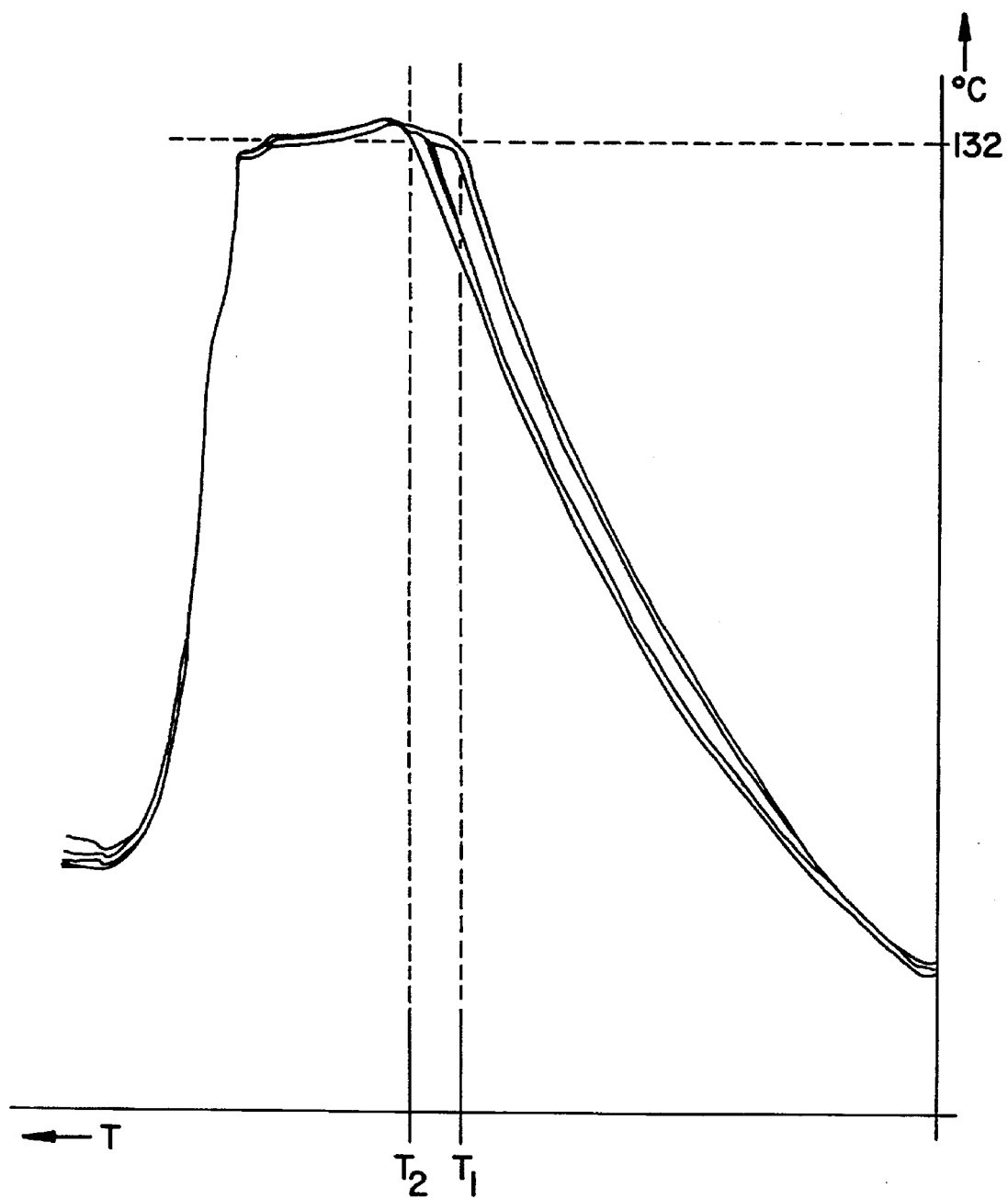
FIGS. 7 to 11 are graphs for demonstrating the results of the method when applied to five different solid foodstuffs.
Figure 8:
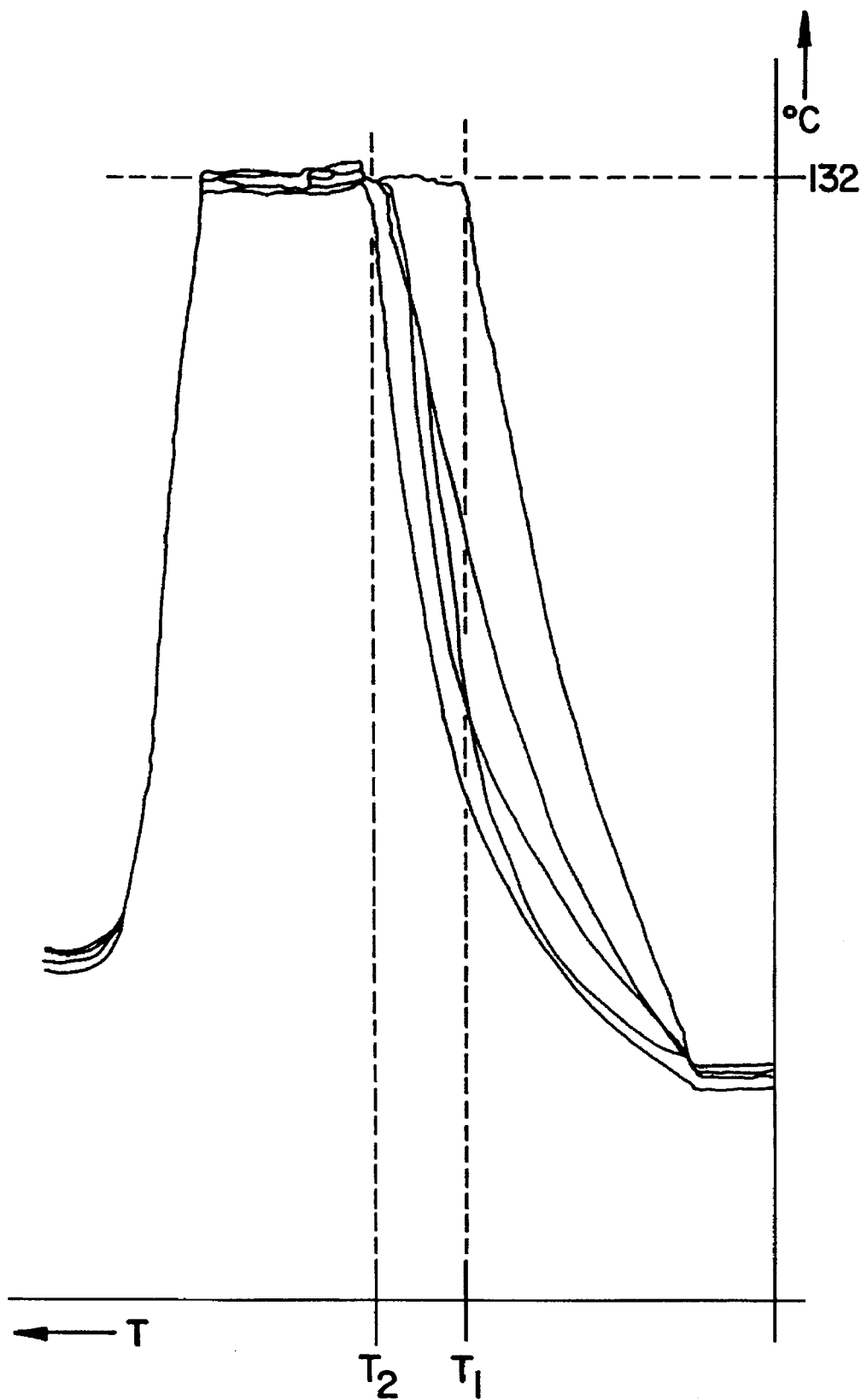
Figure 9:
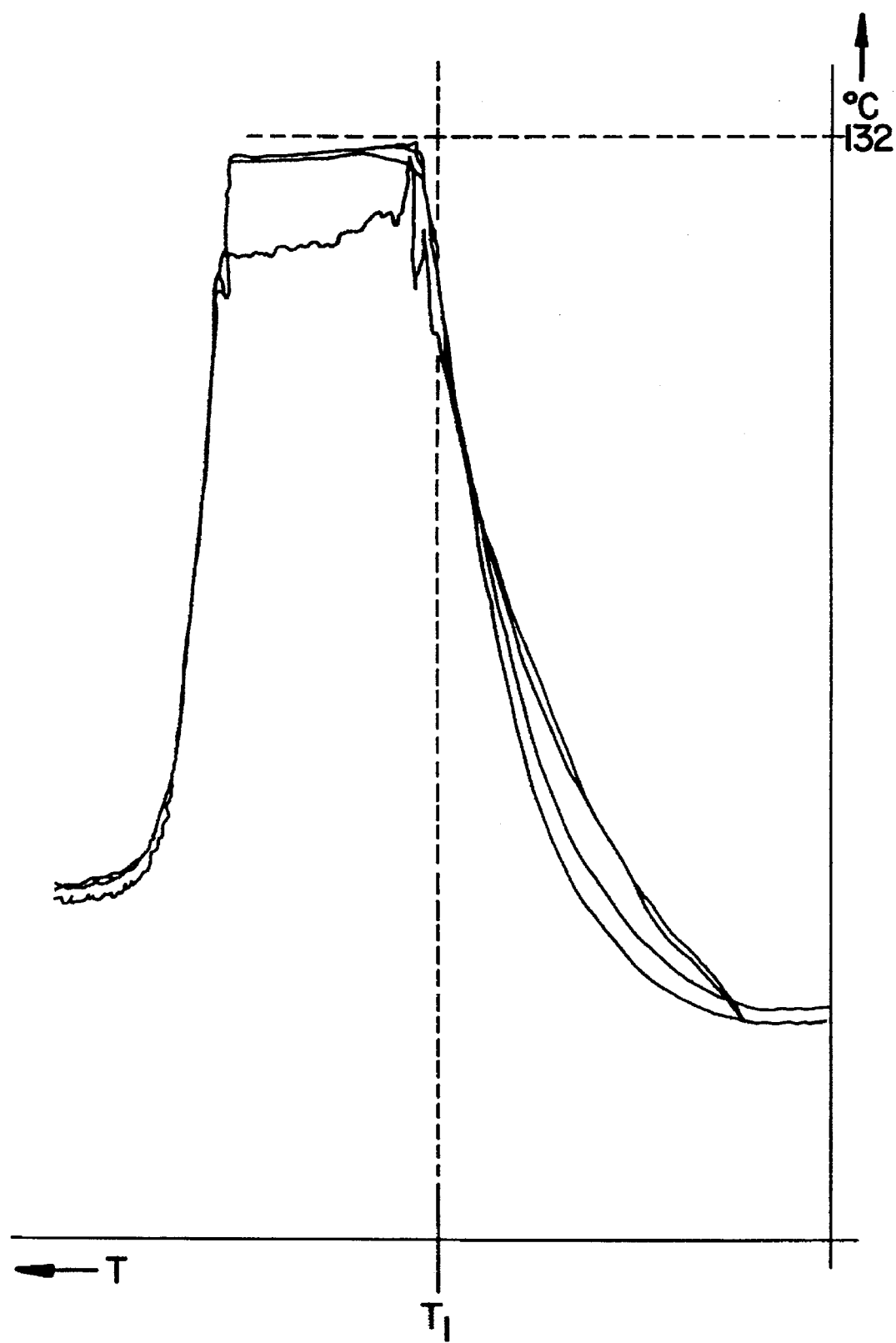
Figure 10:
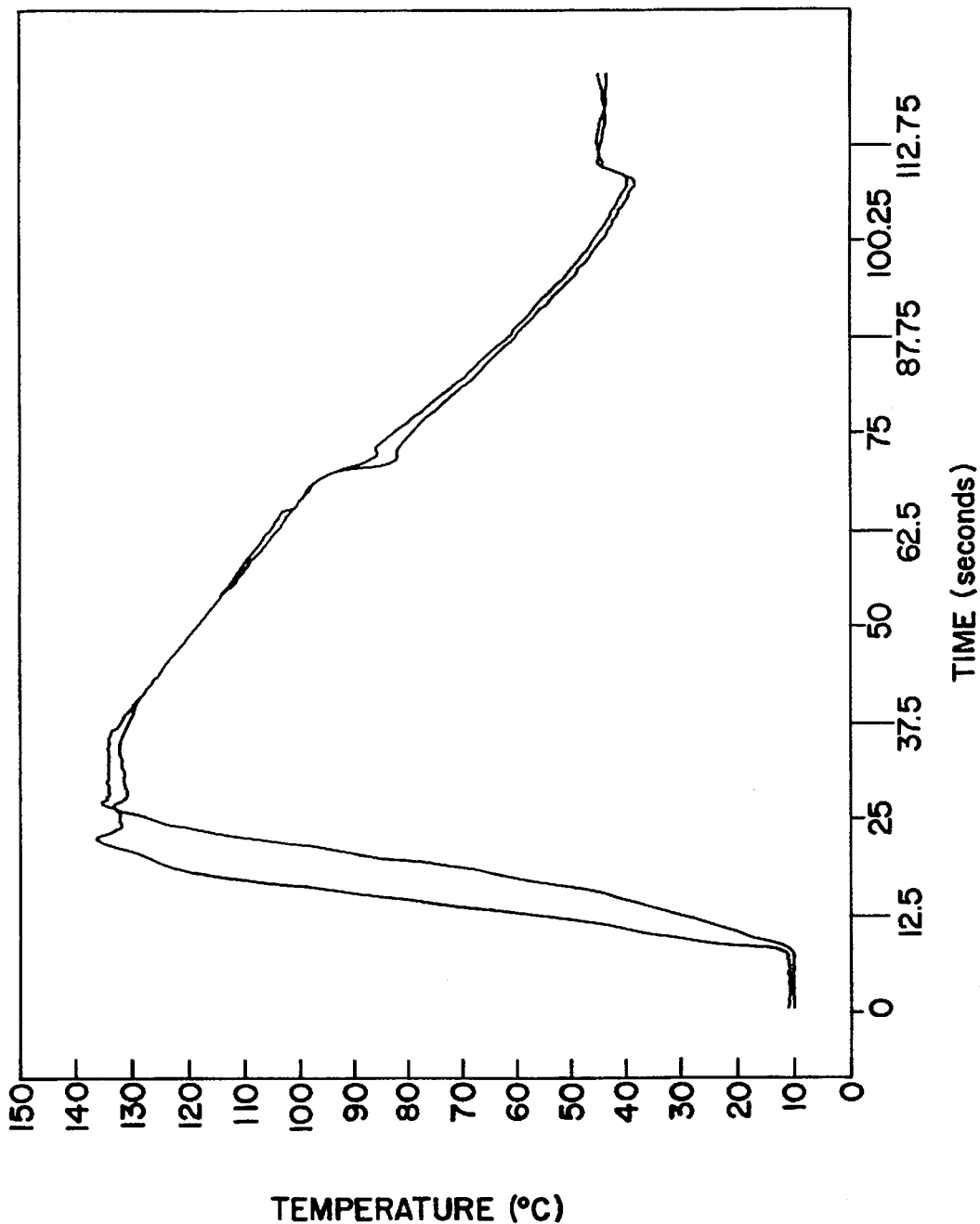
Figure 11:
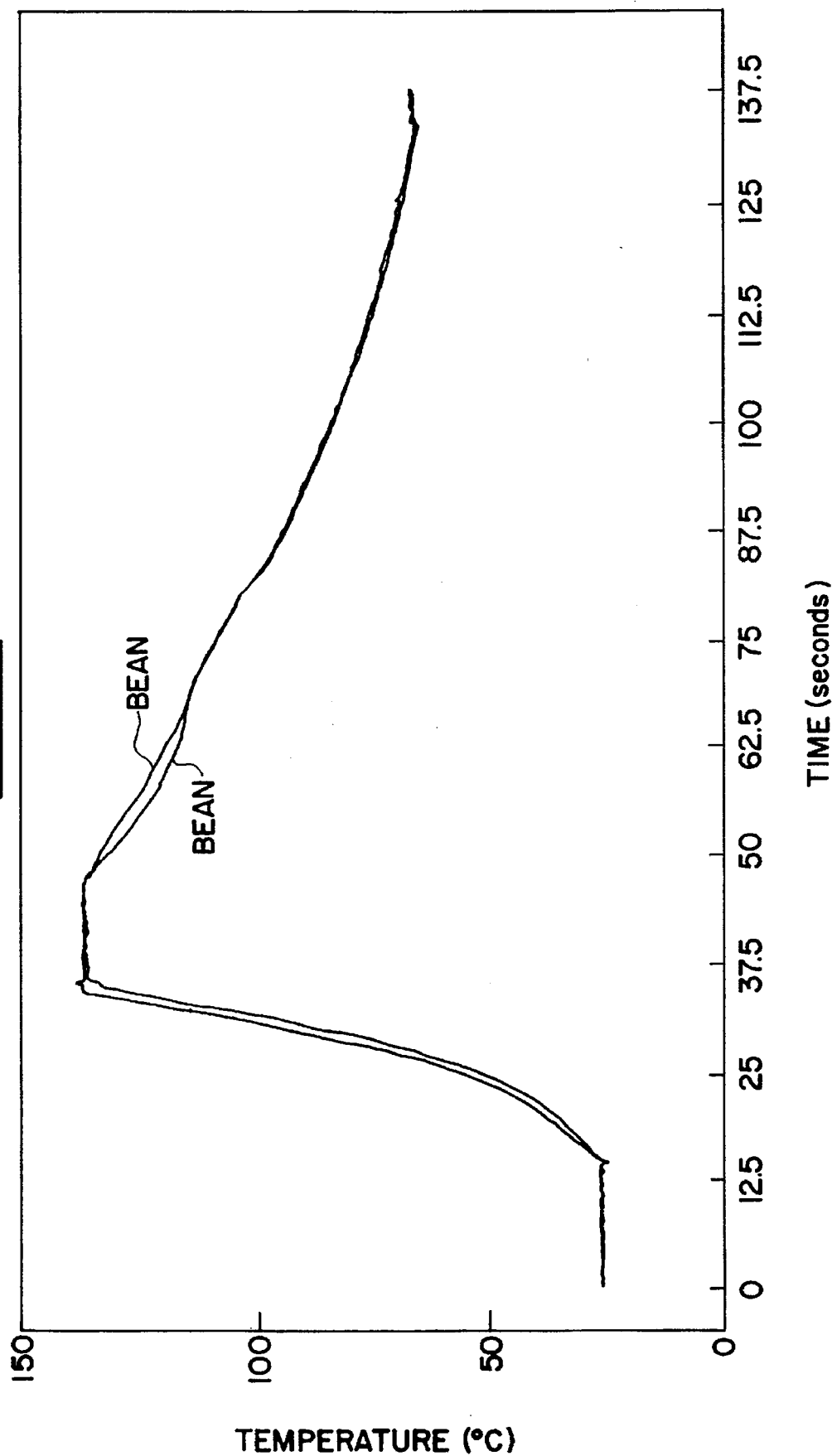

Referring now to FIGS. 7 to 11, the graph of FIG. 7 relates to the chicken breast, FIG. 8 to the courgette, FIG. 9 to the carrot, FIG. 10 to the peas and FIG. 11 to the beans. Temperature in degrees C is indicated on the ordinate, and time T right to left on the abscissa.

In FIG. 7, at time $T_1$ (approximately 110 seconds) corresponding to the beginning of the holding phase, the chicken breast is approaching the target temperature (132° C.) but there is a spread of about 15° C over the five thermocouples. As power continues to be applied, the last thermocouple reaches the target temperature at time $T_2$, although the first four thermocouples to reach the target temperature have not risen substantially above it. Two of the thermocouples have been substantially at the target temperature for longer than two of the others. When power is switched off at time $T_2$, all five thermocouples remain at the exact target temperature for the rest of the holding phase prior to cooling.

In FIG. 8, at time $T_1$, the beginning of the holding phase, there is a wide temperature divergence, of about 70° C. over the five thermocouples, but at time $T_2$ all five thermocouples have reached the target temperature and in general remain at this temperature for the remainder of the holding phase.

In FIG. 9, there is less divergence in the temperatures but one thermocouple shows a major divergence after about time $T_1$. This thermocouple accidently detached from its carrot piece and is floating free in the headspace of the heating cell. FIG. 9 shows the close control of temperatures possible using the method of the invention, in this case a temperature of 130° C.

In both FIGS. 10 and 11, there is some small divergence of thermocouple temperatures during heating, although very small in the case of beans, but remarkably little divergence after a processing time of about 37.5 seconds. In the case of beans, temperature correspondence between the thermocouples was reached near the beginning of the holding phase, but at the end of the holding phase in the case of peas.

In general, in the above examples, there are some irregularities and inaccuracies, primarily due to difficulties in controlling the exact operating conditions, e.g. electrical power and pressure, in the manually operated test rig of FIG. 1. However, methods of automatic control which would overcome these deviations are readily available.

In the above examples, the pressure was set to the SVP of the water in the foodstuff, at the maximum target temperature, throughout heating and holding. However, it is considered, as a logical extension of the above described method, that lesser divergence in the temperatures of different parts of the foodstuff, during heating prior to holding, can be achieved if the pressure is adjusted during heating according to a rising profile so as to approximate to the increasing instantaneous SVP.

The invention is applicable to a wide range of foodstuffs, including meat and fish portions, vegetables such as courgettes, carrots, peas, beans and broccoli, and fruits, particularly soft fruits, such as strawberries, peaches, cherries, raspberries, grapes and plums.

We claim:

1. A method of processing a solid foodstuff which contains water unable to flow but also contains, or on cooking is able to develop internal pathways along which fluid can pass, comprising the steps of:

determining the saturated vapour pressure of water in the foodstuff at a maximum target temperature ranging from 100°–147° C. to be achieved for cooking or sterilization by an iterative procedure which includes placing in a vessel a first quantity of said foodstuff, setting the pressure in said vessel equal to the vapor pressure of water and observing the temperature reached during heating, then repeating the step of setting the pressure by adjusting the pressure in said vessel and observing the temperature reached until a pressure is achieved which enables the maximum target temperature to be reached during heating for cooking or sterilization;

placing a second quantity of said foodstuff in an enclosure to be further processed;

heating said second quantity of said foodstuff in said enclosure to said maximum target temperature at said determined pressure to be achieve for cooking or sterilization, by a mass heating method which directly heats the entire mass of said second quantity of said foodstuff to the maximum target temperature; and controlling the pressure in said enclosure applied to said second quantity of said foodstuff in said enclosure during at least part of the heating step at a pressure substantially equal to said determined saturated vapour pressure of water in said first quantity of said foodstuff at said maximum target temperature, thereby to cause water transiently in the vapour stage to pass along said pathways to achieve a substantially uniform temperature throughout said second quantity of said foodstuff at the maximum target temperature.

2. A method according to claim 1, wherein heating said second quantity of said foodstuff in the enclosure includes a holding phase during which said second quantity of said foodstuff is held for a given period nominally at the maximum target temperature prior to cooling, and the pressure in said enclosure is controlled during at least said holding phase to achieve the required substantially uniform temperature throughout said second quantity of said foodstuff.

3. A method according to claim 2, wherein the pressure in said enclosure is kept constant during heating, at least prior to the holding phase.

4. A method according to claim 3, wherein, during at least part of the holding phase, the pressure in said enclosure is maintained at least approximately at the determined saturated vapour pressure of the water in said first quantity of said foodstuff at the maximum target temperature. ximum target temperature.

5. A method according to claim 4, wherein the pressure in said enclosure is maintained equal to the said determined saturated vapour pressure of the foodstuff at the maximum target temperature throughout the heating step.

6. A method according to claim 4, wherein the pressure in said enclosure is controlled to be approximately equal to the rising saturated vapour pressure of said first quantity of said foodstuff as said second quantity of said foodstuff is heated to rise to the maximum target temperature.

7. A method according to claim 2, wherein the holding phase includes a first part in which the pressure in said enclosure said second quantity of said is controlled to cause all parts of foodstuff to achieve the maximum target temperature and a second part in which said second quantity of said foodstuff is uniformly held at the maximum target temperature to achieve sterilisation.

8. A method according to claim 1, wherein the time for which said second quantity of said foodstuff is in the enclosure at a temperature above 118° C. is less than 60 seconds, and the time for which said second quantity of said foodstuff is above 70° C. is less than approximately 300 seconds.

9. A method according to claim 8, wherein the time said second quantity of said foodstuff is above 118° C. is less than 30 seconds and the time said second quantity of said foodstuff is above 70° C. is less than 100 seconds.

10. A method according to claim 9, wherein the time said second quantity of said foodstuff is at a temperature of above 118° C. is from 15 to 26 seconds.

11. A method according to claim 1, wherein the maximum temperature achieved during heating in the enclosure is from 122° to 147° C.

12. A method according to claim 1, wherein the method additionally comprises transfer of said second quantity of said foodstuff after heating and cooling in the enclosure to an aseptic environment for filling, packing and sealing.

13. A method according to claim 12, wherein the aseptic environment is provided by vaporised hydrogen peroxide.

14. A method according to claim 1, wherein the foodstuff is a meat or fish portion.

15. A method according to claim 1, wherein the foodstuff is a plant foodstuff.

16. A method of processing a solid foodstuff which contains water unable to flow but also contains, or on cooking is able to develop internal pathways along which fluid can pass, comprising the steps of:

determining the saturated vapour pressure of water in the foodstuff at a maximum target temperature ranging from 100°–147 ° C. to be achieved for cooking or sterilization by an iterative procedure which includes placing in a vessel a first quantity of said foodstuff, setting the pressure in said vessel equal to the vapor pressure of water and observing the temperature reached during heating, then repeating the step of setting the pressure by adjusting the pressure in said vessel and observing the temperature reached until a pressure is achieved which enables the maximum target temperature to be reached during heating for cooking or sterilization;

placing a second quantity of said foodstuff in an enclosure to be further processed and immersing said second quantity of said foodstuff in an electrically conductive fluid containing immersed electrodes;

heating said second quantity of said foodstuff in said enclosure to said maximum target temperature at said determined pressure by ohmic heating effected by passing an electric current between said electrodes and through said second quantity of said foodstuff which directly heats the entire mass of said second quantity of said foodstuff; and controlling the pressure in said enclosure applied to said second quantity of said foodstuff in said enclosure during at least part of the heating step at a pressure substantially equal to said determined saturated vapour pressure of water in said first quantity of said foodstuff at said maximum target temperature, thereby to cause water transiently in the vapour stage to pass along said pathways to bring all parts of said second quantity of said foodstuff to the maximum target temperature.

17. A method according to claim 16, wherein during the heating step said second quantity of said foodstuff is supported in the conductive fluid by a carrier adapted to control fluid convection currents in the cell.

18. A method according to claim 17, wherein after heating, the conductive fluid is ejected from the cell prior to cooling, and cooling is effected by applying a partial vacuum to the cell in order to effect cooling by evaporation.

19. A method according to claim 16, wherein the concentration of the conductive fluid is selected to assist achievement of a uniform temperature distribution throughout said second quantity of said foodstuff by an iterative method in which heating and temperature measurement is carried out with differing concentrations of conductive fluid.

* * * * *